July 18, 1933. W. U. GRIFFITHS 1,918,597
VALVE STRUCTURE FOR FLUSH TANKS
Filed June 11, 1929
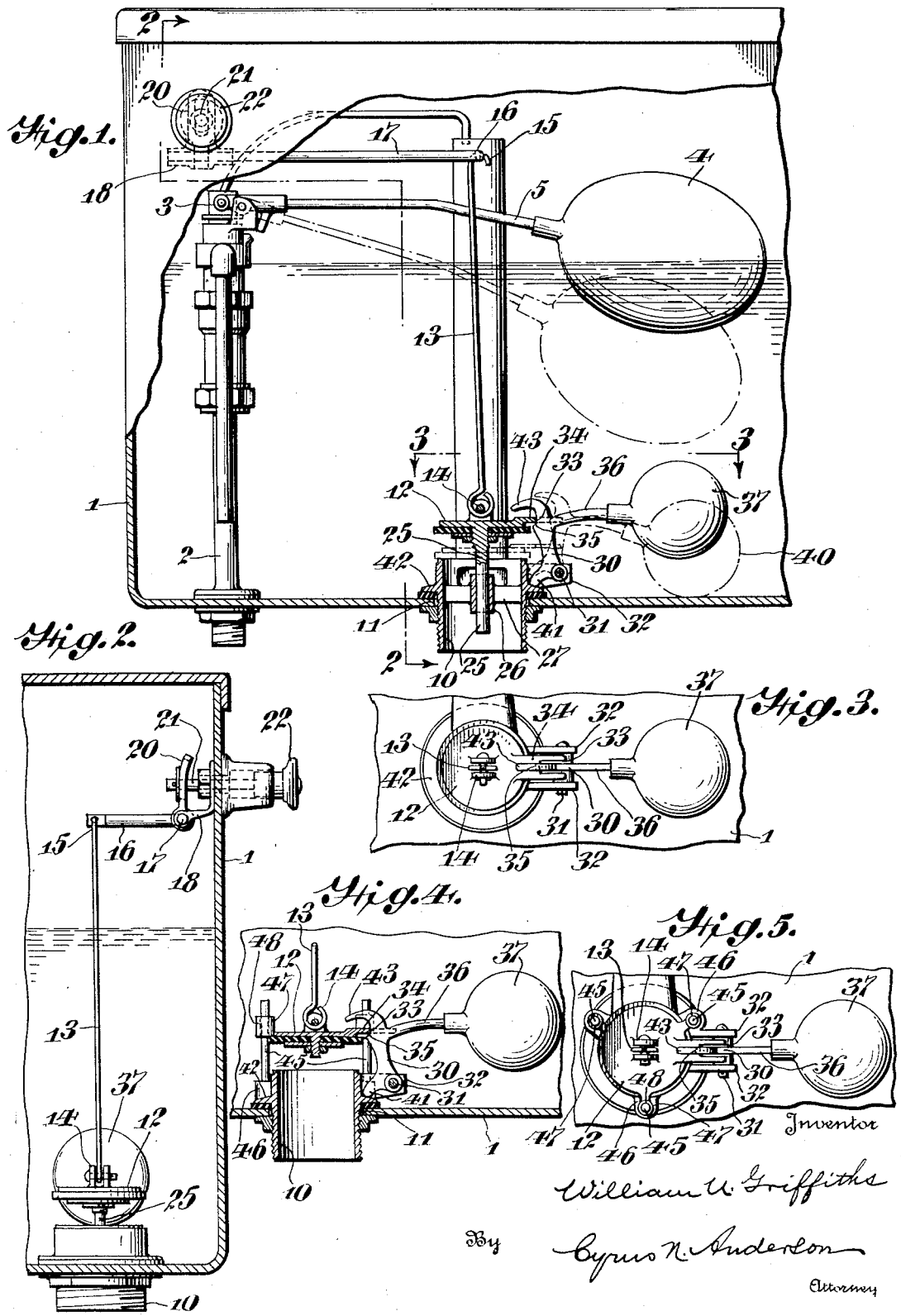
Inventor
William U. Griffiths
By Cyrus N. Anderson
Attorney Patented July 18, 1933

1,918,597

UNITED STATES PATENT OFFICE

WILLIAM U. GRIFFITHS, OF PHILADELPHIA, PENNSYLVANIA

VALVE STRUCTURE FOR FLUSH TANKS

Application filed June 11, 1929. Serial No. 370,038.

My invention relates to improvements in valve structures which are particularly well adapted for use in the flush tanks of sanitary apparatus but also may be used to advantage in any case where water is to be discharged from a tank or other container at intervals for flushing or other purposes.

The general object of the invention is to provide a valve structure having novel means whereby the movable element of the valve structure is adapted to be guided positively in its movements to and from its seat.

It also is an object of the invention to provide a construction of the character indicated which is simple in character and which may be constructed at a minimum of cost.

Another object of the invention is to provide a construction of the character indicated wherein the means for supporting and guiding the movable element of the valve structure is such that it is not likely to get out of order and require repair or replacement.

Other objects and advantages of the invention will be referred to in the detailed description of the structure which follows or will be apparent from such description.

In order that the invention may be readily understood and the practical advantages thereof fully appreciated reference should be had to the accompanying drawing, wherein I have illustrated certain structures embodying the invention in the forms at present preferred by me. However, it will be understood that the invention is susceptible of embodiment in other forms of construction than those shown and that changes in the details of construction may be made within the scope of the claim without departing from the invention or the principle thereof.

In the drawing:

Fig. 1 is a view in vertical sectional elevation showing a portion of a flush tank provided with a valve structure embodying the invention;

Fig. 2 is a view in sectional elevation taken on the line 2—2 of Fig. 1;

Fig. 3 is a horizontal sectional elevation taken on the line 3—3 of Fig. 1 and showing the valve structure in top plan;

Fig. 4 is a view in central vertical section of a modified construction of valve structure embodying the invention; and Fig. 5 is a view in top plan thereof.

In the drawing I have shown at 1 a flush tank which may be of any known construction, to which water is adapted to be supplied through a pipe 2 from a city supply system or other source. Flow of water from the pipe into the tank 1 is controlled by a valve structure at 3 which may be of any known construction, the opening and closing of the movable element of said valve structure being effected by means of a float 4 connected to the outer end of a lever 5.

Outflow of the water from the tank 1 takes place through a pipe (not shown) an end of which is adapted to be connected to a short coupling pipe 10 which is mounted within an opening 11 provided in the bottom of the tank 1, all in known manner. The movable valve element 12 is adapted to be seated against the upper end of the coupling 10, as indicated in dotted lines in Fig. 1 of the drawing, to close the same. The upper end of the coupling 10 constitutes a seat for the movable valve element 12. The opening and closing movements of the movable valve element 12 are effected by means of a link 13 pivotally connected at its lower end to the movable valve element 12, as indicated at 14. At its upper end the link 13 is connected by means of a hook 15 in known manner to the outer end of a projection 16 provided upon one end of a rock arm 17 which is rockingly or oscillatably mounted at its opposite end in a bracket, as indicated at 18, which is mounted upon the tank 1. The arm 17 is provided with a projection 20 which has connection with a rectilinearly movable operating rod or bar 21 which is supported in a bearing upon the tank 1 and projects therethrough and is provided upon its outer end with a knob 22 by which it may be moved in and out to actuate the projection 20 to effect rocking movement of the arm 17 to raise and lower the movable valve element 12 to open and close the same.

For the purpose of supporting and guiding the said movable valve element to and from its seat upon the upper end of the coupling 10 I have provided the said element with a guiding rod or bar 25 which projects at right angles to the plane thereof and extends into and through a guiding sleeve 26 provided axially of the coupling 10. The guiding sleeve is formed integrally with and as a part of a cross-bar 27 the opposite ends of which are connected with diametrically opposed parts of the coupling 10. Preferably the bar 27 is integral with the coupling 10 but such integral relationship is not necessary, as the said bar may be otherwise mounted within the said coupling.

It will be observed that the sleeve 26 constitutes a positive supporting and guiding means for the guiding rod or bar 25 which has rigid connection with the movable valve element 12 of the structure.

For the purpose of controlling the movements of the movable valve element 12 after it has been once elevated by the means provided for that purpose in the operation thereof to permit outflow of water from the tank 1 I have provided a trigger 30 which is pivotally mounted upon a stationary pivot 31 supported upon lugs or ears 32 which project laterally from the coupling 10. The upwardly extending portion of the trigger extends through a notch or slot 33 formed in the outer end portion of a projection 34 which extends outwardly from the edge of the movable valve element 12, as is shown in Figs. 1 and 3 of the drawing. The opposite sides of the notch or slot 34 operate as guides for guiding the trigger 30 in its pivotal movements. The said trigger is provided near the upper end of its inner edge with a shoulder 35 which is adapted to engage the projection 34 underneath the edge portion at the bottom of the notch or slot 33 provided therein and support the movable valve member 12 in elevated position while the water is being discharged from the tank. The trigger 30 is provided with an outwardly extending arm 36 on the outer end of which is mounted a float 37. When the tank contains water in sufficient amount the float rises and causes or tends to cause pivotal movement of the trigger 30 inwardly or toward the movable valve element 12. The tendency of the trigger to move in that direction is continuous during the time that the float 37 is buoyed upwardly by the water in the tank. When the movable valve member 12 is lifted into open position the edge of the bottom of the slot 33 contacts with the trigger, which yields about its pivot 31 sufficiently to permit the projection 34 to move into a position above the shoulder 35, whereupon the trigger immediately again moves inwardly so that the shoulder 35 is carried underneath the edge of the bottom of the said notch or slot 33 and remains in that position until the water is emptied from the tank, so that the float 37 is allowed to fall or descend into the position indicated by the dash-and-dot lines at 40 in Fig. 1.

The trigger 30 is provided with a lateral projection 41 which extends inwardly or toward the coupling 10 and contacts with the upper side of the flange 42 upon the said coupling to thereby limit the inward pivotal movement of the said trigger.

The trigger is provided at its upper end with an inwardly extending hook or bill portion 43 which normally is located in a position above the movable valve element 12, as illustrated in Fig. 1, so that upward movement of the said element is limited. Such limitation of its upward movement prevents disengagement of the rod or bar 25 from the supporting and guiding sleeve 26.

The construction as illustrated in Figs. 4 and 5 differs from that shown in Figs. 1, 2, and 3 in that the rod or bar 25 and the central guiding sleeve and the supporting bar 27 for the latter are omitted. Their equivalent is provided in the upright supporting and guiding posts 45 which project upwardly from lugs 46 provided upon the outer side of the coupling 10. Preferably there are three of these supporting and guiding posts 45, as shown. The movable valve element 12 is provided with projecting ears 47 having the same spaced relation to each other as the posts 45. These projecting ears 47 are provided with holes 48 extending therethrough, through which the posts 45 extend, as is clearly shown in Figs. 4 and 5 of the drawing. The operation is the same in both forms of construction.

Although the operation is believed to be clear from the preceding description of the structure, yet a brief statement of the operation will be given, as follows:

Assuming the movable valve element to occupy its closed position, being seated at such time upon the upper end of the coupling 10, and that it is desired to discharge the water from the tank 1 for a flushing operation or for any other purpose, in such case the link 13 will be elevated or lifted upwardly by the means provided for that purpose, as described, which will cause a corresponding upward and opening movement of the movable valve element. In its upward movement the said valve element will be guided by the guiding rod or bar 25 and the guiding sleeve 26, or by the posts 45 and the ears 47, as the case may be. In its upward movement the bottom edge of the slot 33 will contact with the trigger 30 and move it slightly outwardly about its pivot until such bottom edge has passed the shoulder 35, after which the trigger will return to position with the said shoulder underneath the bottom edge portion of the said notch or slot. The water will then begin to flow from the tank through the tubular coupling 10, and the float 37 as the water recedes will descend until finally it reaches a position somewhat as indicated at 40 in Fig. 1. As the float descends the trigger is moved outwardly about its pivot so as to disengage the shoulder 35 from the bottom edge portion of the notch 33 to release the movable valve element and permit the same to descend by a falling movement, due to gravity, from its elevated position into closed position.

Although the invention has been illustrated as embodied in a valve structure for controlling the outflow of water from the flush tank of a water-closet apparatus or the like, it is to be understood that applicant claims his invention for all purposes for which it may be adapted.

Having thus described my invention, what I claim and desire to secure by Letters Patent is:

A valve structure of the character described which is adapted to open and close a port leading from a container for controlling the outflow of a liquid from said container, which structure comprises a movable valve element, a seat for the said valve element upon which the said element rests when it is in closed position, means for moving the said movable valve element from closed into open position, a trigger pivoted at its lower end, the said trigger extending in a direction in general parallel relation to the axis of the said valve structure and the said trigger having a float connected therewith and located in the said container which operates when a liquid is in the container to cause the said trigger to tend to move about its pivot in a direction toward the edge of the said movable valve element, and the said trigger having means for engaging the said movable valve element for holding the same in open position after it has been once opened, which means is adapted to be automatically disengaged from the said movable valve element to permit closing movement thereof when the liquid reaches a certain point in its discharge, and the said trigger also having means located above the said movable valve element for limiting the opening movement of the latter, means engaging said trigger near its upper end for guiding it in its pivotal movements, and means for supporting and guiding the said movable valve element in its opening and closing movements.

WILLIAM U. GRIFFITHS.